UNITED STATES PATENT OFFICE.

NIELS C. CHRISTENSEN, OF SALT LAKE CITY, UTAH.

PROCESS OF TREATING COPPER ORES WITH AN $SO_2$ SOLUTION FOR THE RECOVERY OF THE COPPER THEREFROM.

1,358,619.  Specification of Letters Patent.  Patented Nov. 9, 1920.

No Drawing.  Application filed April 4, 1919. Serial No. 287,517.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Copper Ores with an $SO_2$ Solution for the Recovery of the Copper Therefrom, of which the following is a specification.

This invention relates to the lixiviation of oxidized ores of copper (or sulfid ores which have been roasted) with an $SO_2$ solution and the recovery of the copper from the solution. The invention relates particularly to the precipitation of the copper from the sulfite solution.

The lixiviation of the ore to secure the copper in solution may be carried out as described in my U. S. Patent #1,278,854, or preferably with the precautions described in my U. S. patent application #226523 so that it is not necessary to describe this part of the process in detail, except to repeat that the ore should be lixiviated with a relatively concentrated $SO_2$ solution free from soluble sulfates. This operation should preferably be carried out by agitating that ore with the $SO_2$ solution. After the copper has been brought into solution the pregnant solution should be removed from the lixiviated ore without long storage and without contact with air.

The object of my invention is to precipitate the copper from the $SO_2$ solution as a cupro-cupric sulfite without the formation of copper sulfate and to do this with reagents which are products of the process, and without the loss of any chemicals.

As described in my U. S. patent application #226523, I can accomplish this precipitation by adding metallic copper to the $Cu_2SO_3$ solution and removing the excess $SO_2$ in the solution as shown below:

$$2CuSO_3 + Cu = Cu_2SO_3 \; CuSO_3$$

but this reaction takes place slowly and incompletely unless the solution is heated, preferably to at least 90 degrees C, and to secure the metallic copper for precipitation some of the precipitated $Cu_2SO_3 \; CuSO_3$ must be reduced to metallic copper by a suitable reducing agent as shown below:

$$Cu_2SO_3, CuSO_3 + Cu = 2Cu_2O + 2SO_2$$

$$Cu_2O + C = 2Cu + CO$$
$$2Cu_2O + C = 4Cu + CO_2$$
$$Cu_2O + CO = 2Cu + CO_2$$
$$Cu_2O + 2H = 2Cu + H_2O$$

It is the object of my invention to avoid this reduction to metallic copper and, if desired, to avoid the heating of the solution.

I avoid this reduction to metallic copper by substituting $Cu_2O$, instead of metallic copper, to precipitate the $Cu_2SO_3 \; CuSO_3$ as shown below:

$$CuSO_3 + Cu_2O + SO_2 = Cu_2SO_3, CuSO_3$$

or $$CuSO_3 + Cu_2O + H_2SO_3 = Cu_2SO_3 \; CuSO_3 + H_2O$$

This reaction may be interpreted to be the same reaction as occurs with metallic copper, the $Cu_2O$ being first acted upon by the sulfurous acid and the copper thus produced reacting with the $CuSO_3$ to form the cupro-cupric sulfite as shown below:

$$Cu_2O + H_2SO_3 = (Cu + CuSO_3) + H_2O$$
$$CuSO_3 + (Cu + CuSO_3) = Cu_2SO_3 \; CuSO_3$$

This reaction takes place more completely at lower temperatures than the reaction with metallic copper, but may be carried out by heating the solution and driving off the excess $SO_2$ just as with metallic copper.

If most of the excess $SO_2$ is first removed from the solution by heating or is drawn off by applying a vacuum, leaving just enough $SO_2$ to complete the reaction, the copper may all be precipitated as the supro-cupric sulfite and all the $SO_2$ be removed from solution without heating.

If it is not desired to remove the $SO_2$ from the solution by heating or by applying a vacuum, all the copper may be precipitated and all the $SO_2$ removed by adding a sufficient excess of $Cu_2O$ to the cold solution to take up all the excess $SO_2$ as shown below:

$$2Cu_2O + 2H_2SO_3 = Cu_2SO_3, CuSO_3 + Cu + 2H_2O$$

which might be written $$2Cu_2O + 2H_2SO_3 = 2CuSO_3 + 2Cu + 2H_2O$$
$$2CuSO_3 + Cu = Cu_2SO_3 \; CuSO_3$$

As shown in the above equations, only one half of the metallic copper form is used up. The remainder is utilized in the roasting operation as later described.

It is thus seen that the precipitation of the copper from sulfite solutions may be brought about in my process by the use of $Cu_2O$ in either hot or cold solutions and that the excess $SO_2$ may be completely removed from the solution by means of $Cu_2O$.

As the precipitated $Cu_2SO_3 \cdot CuSO_3$ coats the $Cu_2O$ and copper with which the $CuSO_3$ or $H_2SO_3$ react and thus protects the interior of the particles, it is necessary that the $Cu_2O$ be very finely divided and that an excess over the theoretical amount be used. It is also necessary that the solution be thoroughly agitated so that the $Cu_2O$ remains in suspension and reacts with the $Cu_2SO_3$ so as to prevent the formation of $CuSO_4$ which occurs when $Cu_2SO_3 \cdot CuSO_3$ is precipitated merely by the removal of the excess $SO_2$ as shown in the following equation:

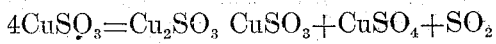

$$4CuSO_3 = Cu_2SO_3 \cdot CuSO_3 + CuSO_4 + SO_2$$

The $Cu_2O$ necessary to precipitate the copper in my process is secured by heating the $Cu_2SO_3 \cdot CuSO_3$ precipitate without access of air and preferably in the presence of a reducing agent, such as carbon, hydrogen, hydrocarbons, copper, or other suitable reagents, to prevent the formation of $CuSO_4$ as shown below:

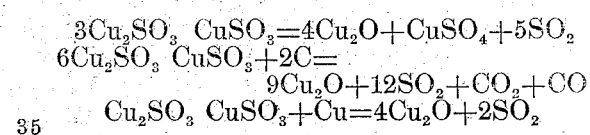

$$3Cu_2SO_3 \cdot CuSO_3 = 4Cu_2O + CuSO_4 + 5SO_2$$
$$6Cu_2SO_3 \cdot CuSO_3 + 2C = 9Cu_2O + 12SO_2 + CO_2 + CO$$
$$Cu_2SO_3 \cdot CuSO_3 + Cu = 4Cu_2O + 2SO_2$$

As before noted, an excess of $Cu_2O$ and $SO_2$ may be used in the precipitation operation thus securing an excess of metallic copper for use in the roasting operation as shown above.

If an excess of reducing agent such as carbon or hydrocarbons is used in the roasting operation some of the $Cu_2O$ may be reduced to metallic copper as the $Cu_2O$ is readily reduced but this copper assists in the precipitation as indicated in the reactions shown and is therefore beneficial rather than detrimental in the process. It is obvious from the equations given that a mixture of $Cu_2O$ and metallic copper may be used in the process and the use of the mixture is advantageous in some cases, especially when the solution is heated during the precipitation operation.

The roasting of the $Cu_2SO_3 \cdot CuSO_3$ precipitate is a very simple operation as the sulfite is readily decomposed by heat. A few minutes heating with a reducing agent at 550 degrees C. is sufficient to drive off all the $SO_2$ and form $Cu_2O$ as indicated.

The $SO_2$ from the roasting operation is used in the lixiviation of more ore as described in my U. S. patent application #226,523.

The advantages of my process are: first, that the $Cu_2O$ need not be reduced to metallic copper to secure the precipitation of the cupro-cupric sulfite, also that if any of the $Cu_2O$ is reduced in the roasting or heating operation the mixture of $Cu_2O$ and metallic copper acts just as efficiently as the $Cu_2O$; second, that the precipitation may be conducted either by heating the solution or with cold solutions, the latter avoiding the expense and difficulties of heating the solution; third, that all the excess $SO_2$ may be removed as well as practically all of the copper without heating the solution, thus giving a barren solution practically free from copper and chemical reagent which may be used for washing the ore in the lixiviation process.

From the foregoing description it is also seen that theoretically no reagents are necessary in my process after the first cycle of operations so that the only loss of reagent is that due to leakage and soluble material, other than the copper compounds, in the ore. The cheapness of the $SO_2$, the only reagent supplied to the process, makes the value thus lost extremely small.

Having described my process what I claim and desire to patent is:

1. The process of treating copper ores which consists in lixiviating the ore with an $SO_2$ solution, separating the pregnant solution from the lixiviated ore and adding $Cu_2O$ to said pregnant solution thereby precipitating the copper from said solution as a cupro-cupric sulfite.

2. The process of treating copper ores which consists in lixiviating the ore with an $SO_2$ solution separating the pregnant solution from the lixiviated ore and removing some of the excess $SO_2$ from said pregnant solution and adding $Cu_2O$ thereby precipitating the copper as a cupro-cupric sulfite.

3. The process of treating copper ores which consists in lixiviating the ore with an $SO_2$ solution separating the pregnant solution from the lixiviated ore, and heating said solution and driving off some of the excess $SO_2$ and adding $Cu_2O$ thereby precipitating the copper as a cupro-cupric sulfite.

4. The process of treating copper ores which consists in lixiviating the ore with an $SO_2$ solution, separating the pregnant solution from the lixiviated ore, and adding $Cu_2O$ and metallic copper to said pregnant solution thereby precipitating the copper from said solution as a cupro-cupric sulfite.

5. The process of treating copper ores which consists in lixiviating the ore with an $SO_2$ solution, separating the pregnant solution from the lixiviated ore, and adding $Cu_2O$ to said pregnant solution thereby precipitating the copper from said solution as a cupro-cupric sulfite, and heating said cupro-cupric sulfite without access of air and driving off the $SO_2$, and using some of said so treated precipitate to precipitate more copper from pregnant solution.

6. The process of treating copper ores which consists in lixiviating the ore with an $SO_2$ solution separating the pregnant solution from the lixiviated ore and adding $Cu_2O$ and metallic copper to said pregnant solution thereby precipitating the copper from said solution as a cupro-cupric sulfite and heating said precipitate without access of air and driving off the $SO_2$ and using some of said so treated precipitate to precipitate more copper from pregnant solution.

7. The process of treating copper ores which consists in lixiviating the ore with an $SO_2$ solution, separating the pregnant solution from the lixiviated ore and adding $Cu_2O$ to said pregnant solution thereby precipitating the copper from said solution as a cupro-cupric sulfite, and heating said cupro-cupric sulfite without access of air and in the presence of a reducing agent and driving off the $SO_2$ and using some of said so treated precipitate to precipitate more copper from pregnant solution.

8. The process of precipitating the copper from an $SO_2$ solution which consists in adding $Cu_2O$ to said solution.

9. The process of precipitating the copper from an $SO_2$ solution which consists in adding $Cu_2O$ and metallic copper to said solution.

10. The process of removing $SO_2$ from an $SO_2$ solution which consists in adding cuprous oxid to said solution and thereby precipitating the $SO_2$ in combination with the copper as a cupro-cupric sulfite.

11. The process of precipitating the copper and removing the $SO_2$ from an $SO_2$ solution which consists in adding $Cu_2O$ to said solution.

12. The process of treating copper ores which consists in lixiviating said ore with an $SO_2$ solution, separating the pregnant solution from the lixiviated ore and adding to said solution cuprous oxid, thereby precipitating the copper as a cupro-cupric sulfite and removing the $SO_2$ from solution as a cupro-cupric sulfite.

13. The process of treating copper ores which consists in lixiviating said ore with an $SO_2$ solution, separating the pregnant solution from the lixiviated ore and adding cuprous oxid, thereby precipitating the copper as a cupro-cupric sulfite and removing the $SO_2$ from solution as a cupro-cupric sulfite and heating said precipitate without access of air and driving off the $SO_2$ and using said $SO_2$ in the treatment of more ore.

14. The process of treating copper ores which consists in lixiviating said ore with an $SO_2$ solution, separating the pregnant solution from the lixiviated ore and adding cuprous oxid, thereby precipitating the copper as a cupro-cupric sulfite and removing the $SO_2$ from solution as a cupro-cupric sulfite and heating said precipitate in the presence of a reducing agent and without access of air and driving off the excess $SO_2$, and using said $SO_2$ in the treatment of more ore, and using said so treated precipitate to precipitate more copper from pregnant solution.

NIELS C. CHRISTENSEN.